April 15, 1952  E. G. KOCH  2,593,036
SUGAR CANE JUICE CLARIFIER
Filed March 29, 1950  2 SHEETS—SHEET 1

INVENTOR.
EDWARD G. KOCH
BY J. Ledermann
ATTORNEY

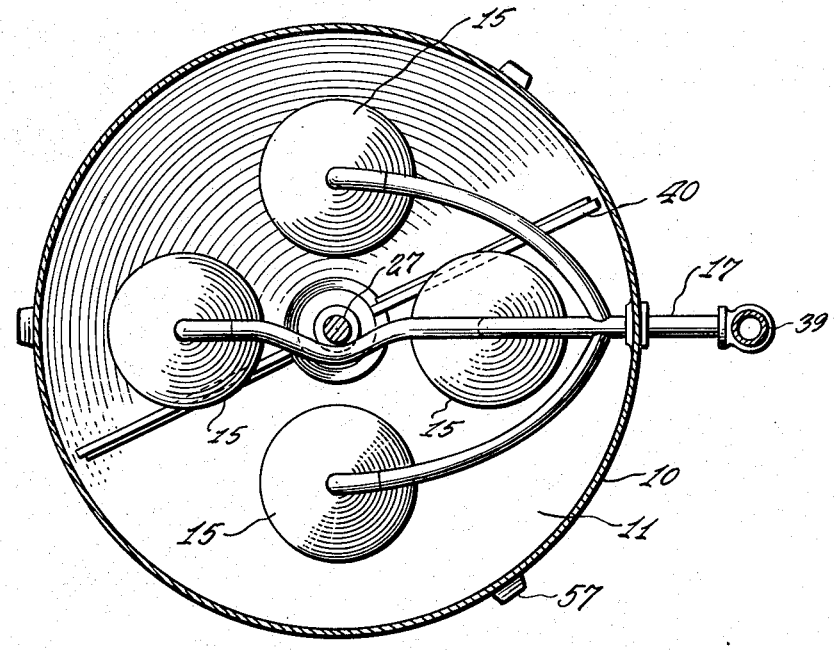
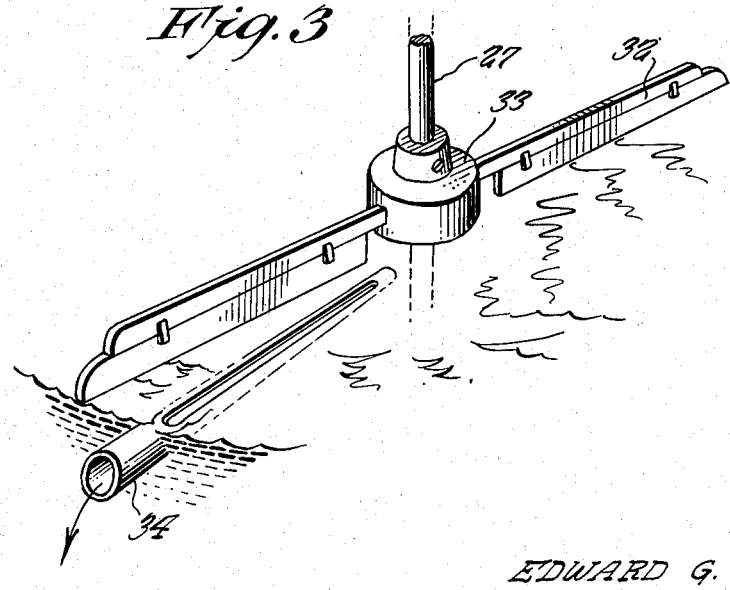

Patented Apr. 15, 1952

2,593,036

UNITED STATES PATENT OFFICE 2,593,036

SUGAR CANE JUICE CLARIFIER

Edward G. Koch, Bayou Goula, La.

Application March 29, 1950, Serial No. 152,551

5 Claims. (Cl. 210—55)

This invention relates to an apparatus for separating finely divided solids from liquids, such as a clarifier separator.

It is an object of the present invention to provide such an apparatus in order to eliminate the trays and compartments which are now used on the conventional continuous flow type separators which retard the downward flow of impurities and mud that cause inversion of sucrose by being held in different stages too long in contact with cane juices, as when the apparatus is used for processing sugar cane juices in the manufacture of sugar, and to provide a settling device of the continuous and closed flow type wherein the impurities in suspension are separated both by flotation in the case of the lighter impurities and sedimentation for the heavier impurities.

Other objects of the present invention are to provide a clarifier separator for separating finely divided solids from liquids which is of simple construction, inexpensive to manufacture, has a minimum number of parts, compact and consumes little space, automatic in operation, wherein the impurities have a straight unmolested downward course to the bottom of the apparatus, provides for scraping means on the bottom of the apparatus, a pump for removing the mud, has a flash tank deaerator conveniently disposed at the top of the main tank for the delivery of the juice to the main tank, has conveniently arranged scum paddles and collecting spout, and efficient in operation.

For other objects and for a better understanding of the invention, reference may be had to the following detailed description taken in connection with the accompanying drawing, in which:

Fig. 2 is a transverse sectional view of the apparatus taken on line 2—2 of Fig. 1.

Fig. 3 is a fragmentary and perspective view of the scum paddles and drain spout for the scum.

Figure 1:
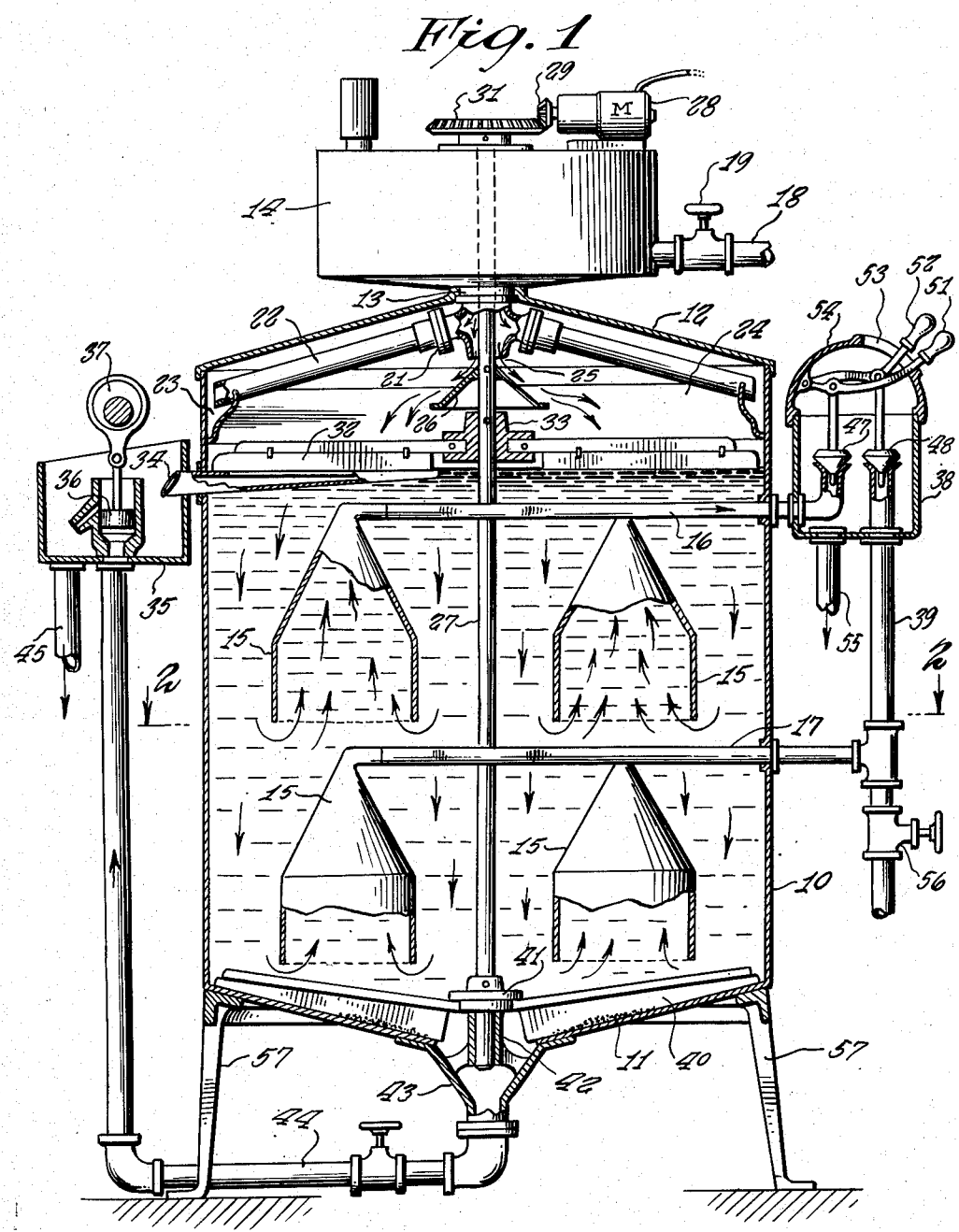
Fig. 1 is a vertical sectional view of the clarifier separator embodying the features of the present invention.

According to the invention there is provided generally an apparatus comprising a closed tank 10, preferably round, having a sloping bottom 11. The capacity of the tank is made such that in proportion to the time and heat necessary a proper clarification or defecation of the juices will be made. A top cover 12 is provided on the upper end of the tank. This cover has a central opening 13. A flash tank or deaerator 14 is supported above the top 12, from which the tank 10 is fed with the sugar cane juices. Within the tank 10 there is provided a plurality of inverted cups 15 which have opening areas equivalent to approximately half the transverse area of the tank. The upper cups 15 are drained by a pipe 16 while the lower cups are drained by a pipe 17. The inverted cups are located in the clarifier tank in one or more rows at any desired level, as found best in practice. The number of rows will depend upon the height and capacity of the tank.

The raw cane juice, after being lined or chemically treated and heated to the proper temperature, is passed first through an inlet pipe 18, a valve 19, to flash tank 14. Within this flash tank the cane juice is deaerated and will flow by gravity to the clarifier tank 10 through the opening 13 in the top thereof. In flowing downwardly, it is received by a juice distributor 21 having pipes 22 leading to a peripheral space 23 provided by an upstanding inwardly extending annular flange 24. The distributor 21 has a central outlet 25 whereby a small portion of the juices passes downwardly over a conical flinging device 26 on a vertical shaft 27 that is driven by an electric motor 28 supported on the top of the flash tank 14 and which has a small pinion gear 29 meshing with a large bevel gear 31 fixed to the upper end of the shaft 27. The lighter impurities will collect at the top of the tank in the form of scum which will be removed by revolving paddles 32 that are connected by a hub 33 with the shaft 27 to be revolved by the same. The scum will be pushed over a drain spout 34 whereby it will be withdrawn from the tank 10. The drain spout leads to a vessel 35 lying at the side of the tank 10 and outwardly thereof and which has therein a plunger pump 36 operated by an eccentric 37 for extracting from the bottom of the tank the heavier impurities that deposit on the bottom 11 thereof. These heavier impurities coagulate and separate from the clear juice. Both the clear juice and the precipitate mud or heavier impurities are made to flow downward for a fixed distance at a slow and uniform velocity and to the bottom level of the first row of inverted vessels 15. At this point, the clear juice travel is reversed and caused to flow slowly and uniformly upwards into the inverted upper row vessels and out through pipe 16 to control box 38, while the precipitate mud or heavier impurities continue to flow downward unmolested and onto the bottom of the clarifier tank. The inverted cups provided by the lower row will also remove clear juice from the concentrated slower settling precipitate. This juice will lead off through pipe 17 and pipe 39 to the control box 38.

It should be noted that in this clarifier tank, the floccules, mud and other particles of impurities have a straight unmolested course downward to the bottom of the clarifier tank and are not molested on their downward course or made to travel counter to the flow of the clear juice. On the bottom of the clarifier, there are provided slow moving revolving arms 40 which are driven by shaft 27. These arms are connected to a hub 41. The lower end of the shaft is supported in a bearing structure 42. This bearing structure is provided on a conical shaped fixture 43 from which extends piping 44 that leads to the plunger pump 36. The mud can be collected in the vessel 35 and will leave the same by gravity through a drain pipe 45.

The control box 38 contains two valves 47 and 48 operated respectively by control handles 51 and 52 extending through an opening 53 in a top cover 54 of the box to which the control levers 51 and 52 are pivoted. From this control box, there extends a drain pipe 55 from which the clear juices are extracted from the apparatus.

If it is desired to clean the apparatus, it can be done by admitting to pipe 39 a flow of cleaning liquid. This is done by opening a valve 56. The bottom of the tank 10 is supported on a leg structure 57.

It should be apparent that there has been provided an apparatus for the separation of finely divided solids from liquids wherein the solids are collected both at the top and bottom by a simple scraping apparatus and delivered to a common outlet source.

It should also be apparent that the extraction of the clear juices need not interfere with the downward movement of the heavier impurities of the juice being processed.

While various changes may be made in the detail construction, it shall be understood that such changes shall be within the spirit and scope of the present invention as defined by the appended claims.

I claim:

1. An apparatus for separating finely divided particles from liquids comprising an upright tank having a roof, said roof having an opening therethrough for entrance into the tank of liquids to be processed, a distributor fitting including a hollow housing having aligned top and bottom openings, said housing being mounted under said roof and extending downward into the top of the tank with said housing openings in alignment with said roof opening, a vertical shaft in said tank having a diameter smaller than the diameters of said aligned openings thereby providing annular passages around said shaft, the diameter of said bottom opening being only relatively slightly larger than the diameter of said shaft, said housing further having a plurality of radial feed pipes extending therefrom and terminating close to but spaced from the wall of the tank near the top thereof, spaced clarifiers in said tank, said clarifiers comprising inverted cup-like housings having openings through the tops thereof, pipes connected to said clarifier openings and extending laterally through said tank wall for discharge of clarified liquid from the tank, said shaft having a conical collar thereon under but close to said bottom opening of said distributor housing for spreading liquid which has entered the tank through said bottom opening.

2. The apparatus set forth in claim 1, said tank having a circumferential trough around the inner wall thereof near the top thereof, the outer ends of said feed pipes being positioned over said trough whereby liquid passing through said feed pipes fills said trough and spills over into the tank.

3. The apparatus set forth in claim 1, said tank having a discharge opening through the wall thereof below said trough near the top of the tank, a horizontal discharge trough extending substantially radially through said discharge opening into said tank and having the inner end thereof spaced from but near said shaft, said discharge trough having the bottom thereof sloping downward in a radial outward direction.

4. The apparatus set forth in claim 1, said tank having a discharge opening through the wall thereof below said trough near the top of the tank, a horizontal discharge trough extending substantially radially through said discharge opening into said tank and having the inner end thereof spaced from but near said shaft, said discharge trough having the bottom thereof sloping downward in a radial outward direction, means connected to said shaft for rotating the same, radial paddles extending horizontally from said shaft, said paddles having their lower edges lying approximately in the plane of the top of said discharge trough and being adapted during rotation of said shaft to move scum from the top of the liquid in the tank into said discharge trough.

5. The apparatus set forth in claim 1, said clarifiers being positioned at different levels in said tank, a collector housing outside the tank for collecting the clarified liquid from said clarifiers, said pipes which lead from said clarifiers terminating in said collector housing, the ends of said last-named pipes in said collector housing having valves therein for opening or closing said last-named pipe ends, and means for selectively opening or closing said valves, said collector housing having a discharge outlet.

EDWARD G. KOCH.

REFERENCES CITED

The following references are of record in the file of this patent:

UNITED STATES PATENTS

| Number | Name | Date |
| --- | --- | --- |
| 1,071,917 | Hendryx | Sept. 2, 1913 |
| 1,385,701 | Mills | July 26, 1921 |
| 1,405,022 | Slade | Jan. 31, 1922 |
| 1,752,789 | Downs | Apr. 1, 1930 |
| 1,923,143 | Gouner | Aug. 22, 1933 |
| 2,069,989 | Adams | Feb. 9, 1937 |

FOREIGN PATENTS

| Number | Country | Date |
| --- | --- | --- |
| 882,984 | France | Mar. 15, 1943 |